S. A. S. HAMMAR.
BREECH MECHANISM.
APPLICATION FILED SEPT. 10, 1906.

902,487.

Patented Oct. 27, 1908.

Witnesses
Edward Rowland
Marjory Frost

Inventor
Sigard A. S. Hammar,
By his Attorneys
Prindle and Williamson.

S. A. S. HAMMAR.
BREECH MECHANISM.
APPLICATION FILED SEPT. 10, 1906.

902,487.

Patented Oct. 27, 1908.

Witnesses
Edward G. Rowland
Marjory Frost

Inventor
Sigard A. S. Hammar
By his Attorneys
Prindle and Williamson

S. A. S. HAMMAR.
BREECH MECHANISM.
APPLICATION FILED SEPT. 10, 1906.

902,487.

Patented Oct. 27, 1908.

Witnesses
Edward Rowland
Marjory Frost

Inventor
Sigard A. S. Hammar,
By his Attorneys
Prindle and Williamson.

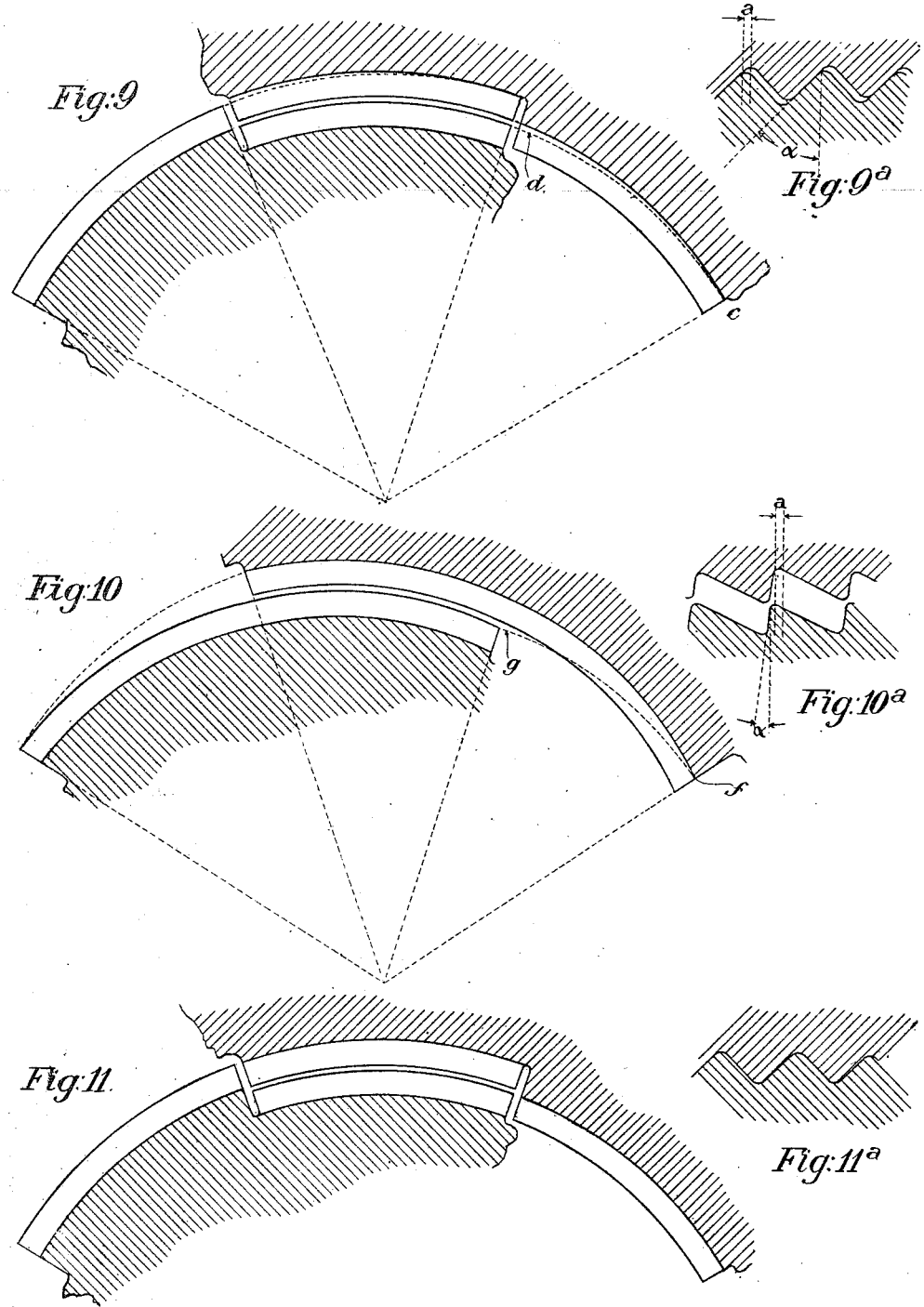

S. A. S. HAMMAR.
BREECH MECHANISM.
APPLICATION FILED SEPT. 10, 1906.

902,487.

Patented Oct. 27, 1908.
6 SHEETS—SHEET 5.

UNITED STATES PATENT OFFICE.

SIGARD A. S. HAMMAR, OF BETHLEHEM, PENNSYLVANIA.

BREECH MECHANISM.

No. 902,487.  Specification of Letters Patent.  Patented Oct. 27, 1908.

Application filed September 10, 1906. Serial No. 334,073.

*To all whom it may concern:*

Be it known that I, SIGARD A. S. HAMMAR, of Bethlehem, in the county of Northampton and in the State of Pennsylvania, have invented a certain new and useful Improvement in Breech Mechanism, and do hereby declare that the following is a full, clear, and exact description thereof, reference being had to the accompanying drawing, in which—

Figure 1 is a longitudinal section through the breech of a gun embodying my invention. Figs. 2 and 3 are transverse sectional views through the breech of a gun and the breech block, which respectively show the breech block in unlocked and locked position. Fig. 4 is an enlarged sectional view showing the collars or threads when the breech block is in partly unlocked position. Fig. 5 is a view corresponding to Fig. 4 and showing the threads when the breech block is in the position illustrated in Fig. 3. Fig. 6 is a longitudinal sectional view of a portion of the breech of a gun, showing that form of my invention in which helical threads are used. Figs. 7 and 8 are respectively a plan view and an end elevation in which collars are used instead of helical threads. Fig. 9 is a transverse sectional view, showing the relative paths of movement of the collars or threads of my breech mechanism. Fig. 9ª is a longitudinal, sectional view, showing the relation between the slope of my threads or collars, and the advance. Fig. 10 is a partial, transverse, sectional view, showing the relative movements of the threads or collars of the Meigs and Hammar breech mechanism. Fig. 10ª is a longitudinal, sectional view, showing the relation between the advance and the slopes of the threads or collars of the said Meigs and Hammar mechanism. Fig. 11 is a transverse, sectional view, showing the relations of the threads of the Welin breech mechanism later referred to; and Fig. 11ª is a longitudinal, sectional view, showing the threads engaged. Fig. 12—is a longitudinal sectional view of an almost fully unscrewed breech mechanism having a breech block partly cylindrical and partly conical that is provided with my stepped collars. Fig. 13—is a similar view of a breech mechanism, having an ogival or spindle-shaped breech block, and any stepped eccentric collars. Fig. 14—is a similar view of a mechanism in which the breech block is partly cylindrical and partly conical and is provided with a helical screw thread. Fig. 15—is a view of a similar breech mechanism in which are used eccentric collars that are not stepped. Fig. 16—is a similar view of a breech mechanism in which the block is of truncated ogival or spindle shape and is provided with a helical screw thread.

The object of my invention has been to provide a breech mechanism which shall have, among others, the following advantages. That of permitting a fine or small pitch to be used with a very coarse collar or thread; that of having the maximum threaded area for a given size of screw box; that of permitting very coarse collars or threads for a given pitch; that of having ample strength to sustain the breech or block when the block is partially unscrewed, to prevent the block from being blown out of the gun when it is nearly but not quite in locked position; that of permitting the use of a more or less flat collar or thread, and that of eliminating friction during the latter part of the unlocking movement; and to such ends my invention consists in the breech mechanism hereinafter specified.

In carrying my invention into practice, the breech of the gun is provided with a screw box A which receives the breech block or plug B. The plug may be supported upon any suitable carrier, or in any desired manner to give it the required motions, and it may be cylindrical, or tapering, or of other form, as desired. The mechanism for rotating and inserting and withdrawing the plug is well known in the art and I, therefore, have not illustrated such mechanism. In the embodiments of my invention, which are illustrated herein, I have chosen to show a cylindrical breech block, or one having a uniform diameter in any given plane perpendicular to its axis. Block B is provided with a series of unthreaded surfaces or steps C, extending through a portion of its circumference and preferably throughout the length of the breech block. Adjacent to each surface, or step C is a similar surface or step D of substantially the same angular extent, and such surface is provided with a series of collars or threads d, which, in the form illustrated in Figs. 1 to 5, are in a plane perpendicular to the axis of the breech block and are not inclined either forward or backward like a helix. Adjacent to the surfaces D is a surface or step E, which is approximately of the same radius as the collars or threads $d$, and upon the said surface are formed a series of threads or collars $e$, similar to the threads or collars $d$.

The screw box A is provided with a series of surfaces or steps F, which, like the surfaces C, have no collars or threads, but which are of a radius slightly greater than that of the threads $e$. Similarly the screw box is provided with surfaces or steps G which correspond with the surfaces or steps D, and which are on the same side of the surfaces F as the surfaces D are of the surfaces E. The surfaces or steps G are provided with collars or threads $g$. The screw box is also provided with surfaces or steps H, which are of slightly greater radius than the screw threads $d$ and which stand over the surfaces C in the unlocked position of the breech block. The surfaces H are provided with collars or threads $h$. The collars or threads $d$ and $e$ may be merged into each other by curved portions, as may also the collars or threads $g$ and $h$. All of the surfaces C, D, E, F, G and H are eccentric to the axis of the breech block, and may be spirals, circular arcs, or other curves, but the eccentricity is preferably slight, it being just sufficient to give in conjunction with the thrust sides of the collars later described, a suitable pitch or advance to the breech block, the stepped collars of the breech block clearing those of the screw box, principally by being, in the unscrewed position, opposite steps of a larger radius.

As in the form of my invention illustrated in Figs. 1 to 5 inclusive, the collars or threads are all perpendicular to the axis of the breech block, and, therefore, have no helical direction tending to advance the breech block toward the powder chamber, as is necessary, some means must be provided for advancing and retracting the breech block slightly during its rotation. I accomplish this result by giving the forward or thrust side $h'$ of the collars or threads $h$ an inclination forward and by giving the rearward or thrust side $d'$ of the collars or threads $d$ an inclination rearward, so that, as the collars or threads $d$ ride upon the collars or threads $h$, the relatively radial movement which will occur, owing to the eccentricity of the collars, will cause the collars $d$ to ride from the position illustrated in Fig. 4 to that illustrated in Fig. 5, thus causing the collars $d$, so to speak, to slide down the hill, or inclination of the thrust side $h'$ of the collars $h$ in a forward direction, causing the breech block to advance as it rotates, and thus giving an actual helical motion and in effect the motion of a screw.

In the operation of my breech mechanism, as illustrated in Figs. 1 to 5, the breech block is inserted into the gun and occupies the position of Fig. 2, in which position the collars $e$, which are those of greatest radius; that is, the highest steps of the breech block, are over the surfaces F in the screw box, and the collars $d$ just clear the collars $g$, and the lowest step C of the breech block is over collars $h$ of the screw box. To lock the breech block, the block is given a right hand motion; and the collars $e$, constituting the highest steps of the breechblock, enter between the collars $g$ which form the second step of the screw box, and the collars $d$, which form the second step of the breech block, enter between the collars $h$, forming the highest step of the screw box. The surfaces C and F are opposite each other and to this extent the breech block and the screw box are not intermeshed. The number of the steps may be made as great as desired, and thus the portion of the circumference occupied by the plain surfaces may be made as small as desired, and the area of the engagement between the breech block and the screw box thus indefinitely increased. As the corresponding collars of the breech block and the screw box engage, the advancing movement before described in connection with Figs. 4 and 5 takes place.

It is old, as shown in the patent to J. F. Meigs and S. A. S. Hammar, No. 680,386, August 13, 1901, to use threads or collars on the breech block which are eccentric to the axis of the breech block, with recesses or unthreaded surfaces between the threaded surfaces, the eccentricity of the threads or collars causing a relative radial movement between the threads or collars of the block and those of the screw-box, and the adjacent faces of the threads or collars are inclined or oblique with reference to the axis of the gun, so that such relative radial movement causes a forward movement of the breech block as the threads or collars are brought into complete engagement. The relative movement of the threads or collars of the breech block of this patent are illustrated in Fig. 10 of the present application for patent. It is also old, as shown in the patent to A. Welin, No. 497,695, May 16, 1903, to provide a breech block with a series of steps of relatively greater radius, each of which steps, except one, is provided with helical threads or collars. The series of steps of relatively greater radius of the breech block of this patent is illustrated in Fig. 11 of the present application for patent. In this patent, however, the threads or collars are not eccentric, and there is no relative radial movement between the threads or collars of the breech block and those of the screw-box, the screw-box being provided with a complemental series of threaded steps, the steps of greatest radius, however, being unthreaded.

While my breech mechanism, like the Meigs and Hammar mechanism, above referred to, is provided with eccentric threads or collars having relative radial movements, and having inclined co-acting surfaces, so that the radial movement results in a forward movement of the block, my breech mechanism, unlike that of the patent to Meigs and Hammar, has such threads or collars applied to a series of steps of successively greater radii, somewhat after the manner of the Welin breech mechanism above referred to. While my breech mechanism thus has a feature in common with each of the said patents, the combination of these features produces a breech mechanism having all of the advantages of the mechanism of both of said breech mechanisms, and neither of the said breech mechanisms possesses all of said advantages.

Comparing Figs. 9ª and 10ª, it will be seen that for a given advance $a$, my block has a better angle of slope alpha than the Meigs and Hammar block, because the slope is much less abrupt. It will also be seen that my block has a better engagement when partly unscrewed than that of the Meigs and Hammar block. The dotted lines $c$—$d$ and $f$—$g$ respectively show the path of a given point on the breech block sliding on the collar of the screw-box in unscrewing. In my mechanism, the top of the thread of the breech block is at the radius of substantially the bottom of the thread of the screw-box, until it arrives at the completely unscrewed position. In the Meigs and Hammar breech mechanism, the top of the thread of the block rapidly passes toward the top of the thread of the screw-box, during an early stage of the unscrewing.

I will now state and enumerate the advantages of my breech mechanism, and in stating which of these advantages is lacking in the Meigs and Hammar, and the Welin breech mechanisms, will show the advantages of my mechanism over that of Welin, as well as that of Meigs and Hammar.

First, the pitch or amount of advance of the breech block in the direction of its axis is independent of the coarseness of the collars or threads, and such collars may be made as large as desired. It has been found in practice that a single large thread is stronger than a double thread of the same pitch, so that a coarse thread or collar is desirable. This advantage is not possessed by the Welin mechanism.

Second, the axial advance of the breech block produced by the angular movement is dependent solely upon the eccentricity and the slope of the thrust surfaces of the collars or threads on the screw box and breech block, respectively, so that as fine a pitch as desired may be obtained by properly proportioning these factors. It is highly desirable to have a fine pitch, or slight movement in the direction of the axis of the breech block, because the finer the pitch, the less likely that the breech block will be loosened by the explosion. This advantage is not possessed by the Welin mechanism.

Third, as the corresponding collars or threads are disengaged more by the stepping of the collars than by their eccentricity, the degree of eccentricity need be only sufficient to give in conjunction with the thrust slope of the collars the proper pitch or advance of the plug. It will be seen from Figs. 4 and 5 that a small eccentricity with a thrust slope of the ordinary steepness will produce a comparatively fine pitch or advance of the block. The eccentricity being slight may be considerably increased or decreased relatively without becoming absolutely so great as to weaken the collars in their partly unscrewed position or so small as to produce friction during the turning of the block. Thus by changing the eccentricity a fine pitch of the screw block may be maintained or any desired pitch may be made and the thrust surfaces of the collars or threads may be made to form any desired angle with the walls of the screw box, and any desired portion of the strain of the breech block, transferred radially from the collars on the breech block to the body of the breech. This advantage is not possessed by either the Meigs and Hammar or the Welin mechanism.

Fourth, the eccentricity of the various collars causes the collars to draw away from each other immediately upon the partial unlocking rotation of the breech block, and thus eliminates friction during the latter part of the unscrewing of the breech block, which friction, with screw blocks of the ordinary type, obtains throughout the unscrewing. This advantage is not possessed by the Welin mechanism.

Fifth, my breech block admits of the threads or collars having a small degree of eccentricity, which is very desirable also, because, while the friction is relieved as soon as the turning movement begins, the breech block is supported against being blown out by the collars on the screw box until it has nearly reached the unscrewed position, since, until it has reached that position, the corresponding steps are still somewhat engaged. This advantage is not possessed by the Meigs and Hammar mechanism.

Sixth, the threaded areas for a given size of screw box can be made very large, so that the breech mechanism will have great strength to withstand the explosion in the gun.

Seventh, with a helical thread, such as is commonly used in breech mechanism, the thread must stop some distance from the front end of the screw box, because a counter-bore must be made for the clearance of the thread cutting tool. As I can produce a screw motion with a collar that is not helical, but is perpendicular to the axis of the screw box, a collar can be formed at the front end of the screw box, and the corresponding collar on the breech block will fill the counterbore mentioned which need be just sufficiently large to admit this collar. Thus one collar will be added and for a given length of screw box, the area of engagement, between the breech block and screw box is increased. This advantage is not possessed by the Welin mechanism.

Eighth, with a helical screw thread, furthermore, the thread at each end terminates in a fine point or knife edge, and these knife edges are so weak that they are practically useless. As my collars are perpendicular to the axis of the breech block, no such knife edges are formed. The collars at each end are full and perfect and give further strength to the mechanism.

Ninth: Since the eccentricity of the threads or collars of my mechanism need only be sufficient to seat the breech block and relieve the friction, the disengagement being produced more by the use of the steps than by the eccentricity, the eccentricity can be so slight that the threads or collars are engaged almost their whole depth throughout the whole of the unlocking movement, and thus the strength of the breech mechanism with the block partly unscrewed is ample throughout the whole of the unlocking movement. This advantage is not possessed by the Meigs and Hammar mechanism.

So far in the consideration of my invention it has been illustrated only as applied to prismatic breech blocks, that is, to breech blocks whose elements are parallel to the axis and it has only been compared with prismatic breech blocks of other types. My invention will now be illustrated as applied to breech blocks partly cylindrical and partly conical and compared with similar shaped breech blocks having other types of threads or collars.

In analyzing the relative movements of the collars on my breech block and screw box, it is to be observed, first, that the eccentric collars of my breech block, when locking or unlocking, have a radial movement with regard to the opposite collars of the screw box; second, that if a plane be passed through the axis of the block, all points in the intersection of this plane with the surface of the collars will have an equal radial movement, if all the curves are parallel to each other as they are in involutes and in other curves of small eccentricity; third, whether the block is altogether prismatic or partly conical or of any other outline such as ogival or spindle shape, if the eccentric line forming the outline of a step is an involute or if it is a spiral or an eccentric arc of small eccentricity: that is, one that gives comparatively small radial movement in locking and unlocking (smaller than the height of the collars), then the radial movement of all points in any transverse plane are equal, because the line remains practically parallel to itself. Since from the second statement every point in a longitudinal plane has an equal radial movement, and since from the third statement every point in a transverse plane has an equal radial movement, it follows that all points on the surface of the breech block have an equal radial movement where the contour is an involute or where the spirality (and consequently the radial motion) is very small. The motion to the rear in unscrewing depends on the radial motion and the slope of the thrust face of the collars; therefore, since my radial motion is the same for all points, I only have to make the thrust slope of all the collars uniform (that is, at the same angle to the axis) which is the easiest mode of manufacture, and the motion to the rear will be the same for all points on the collars of the block, no matter whether the block is prismatic or of any other shape. This is clearly illustrated in Figs. 12 and 13. The same is true of the Meigs and Hammar block, Fig. 15, but there the radial movement is very great (greater than the depth of the collars) and therefore any errors in manufacture or departure from the true involute will cause an uneven engagement when the block is partly unscrewed. This is because the involute is the only curve that always remains parallel to itself when the eccentricity is great, as in the case of the Meigs and Hammar block. Therefore, as the engagement in my block is practically even, notwithstanding slight errors, all of my collars or threads are taking part in withstanding the strain at all times whether the block be partly unscrewed or not, and the danger of blowing the block out of the screw box is slight. While with the Meigs and Hammar construction, unless the workmanship is practically perfect, the engagement will not be even, and the whole strain will be borne by part only of the collars. Moreover, with the Meigs and Hammar construction the collars disengage so fast that their strength is materially decreased by the least unscrewing.

The helical thread when on a cone has a motion to the rear in disengaging which is greater than the "advance" of the helix. This is owing to the radial movement due to the eccentricity which a helical thread has when formed on a conical surface, or surface other than a cylindrical surface. When on a cylinder or prism this motion is only equal to the "advance" of the helix. Therefore if the block consists of a cylindrical and a conical part, or, if it is of any other form than entirely a prism or entirely a straight cone, only those threads will be engaged when the block is partly unscrewed which are on a prismatic portion of the block or the portion which is most nearly parallel to the axle of the block. This is illustrated in Fig. 14 on a block that is partly cylindrical and partly conical. While the threads on the cylindrical part are all engaged so long as any of them are engaged, the first movement in unscrewing disengages the thread on the conical part, because the latter thread not only retreats the amount of the "advance" of the helix, but separates radially, owing to the eccentricity which the thread assumes on a conical surface. This fact is further illustrated in Fig. 16, in which, as the block is ogival or spindle shape, the degree of taper of the surface on which the thread is formed increases towards the point of the spindle, and consequently the separation between the threads becomes progressively greater from the rearmost thread towards the front.

In each of the Figs. 12 to 16 inclusive the same percentage of unscrewing movement is illustrated.

Figure 1:
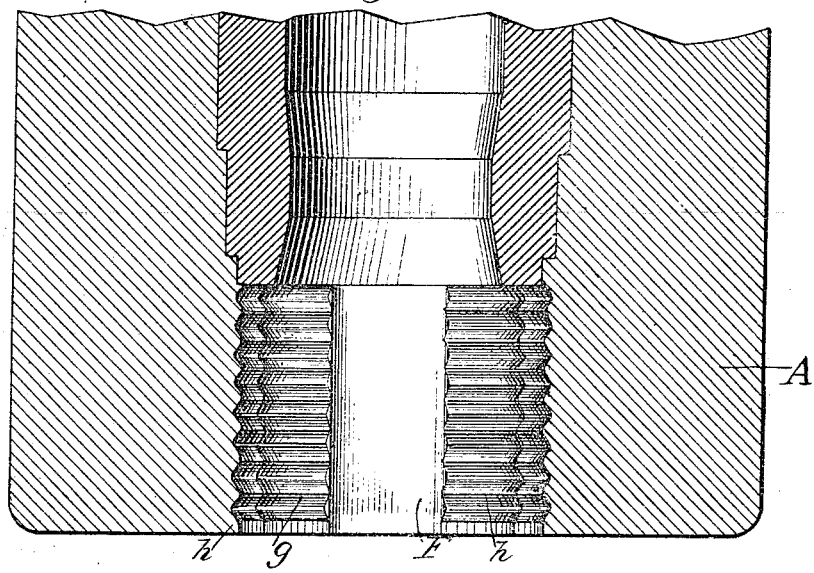
Figure 2:
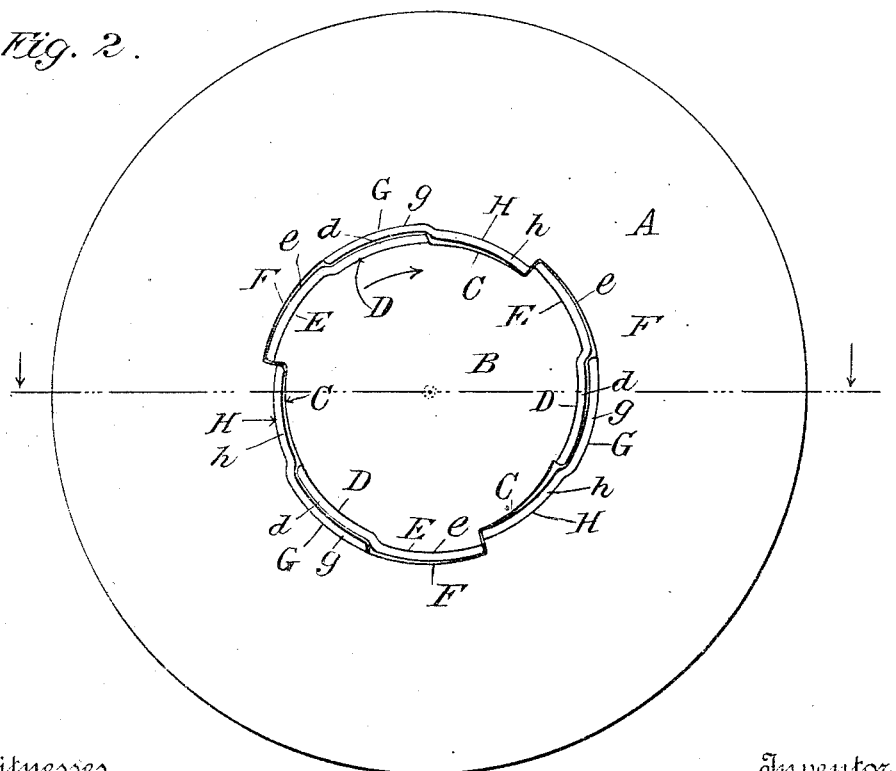
Figure 3:
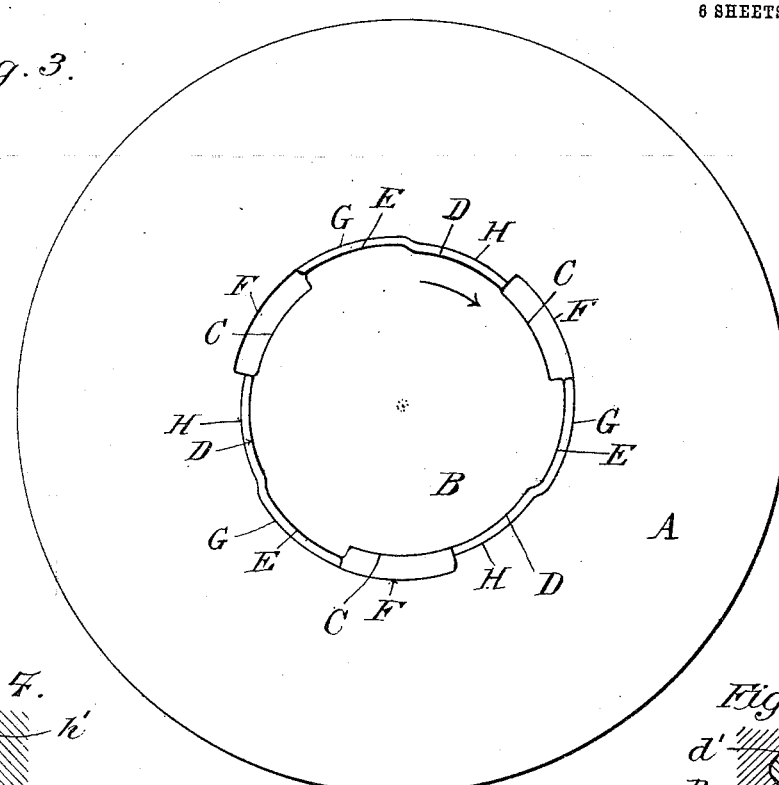
Figure 4:
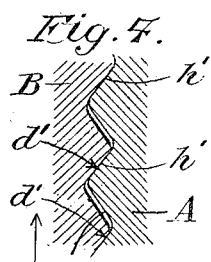
Figure 5:
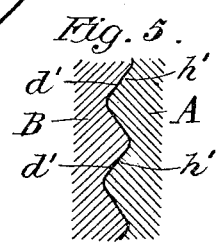
Figure 6:
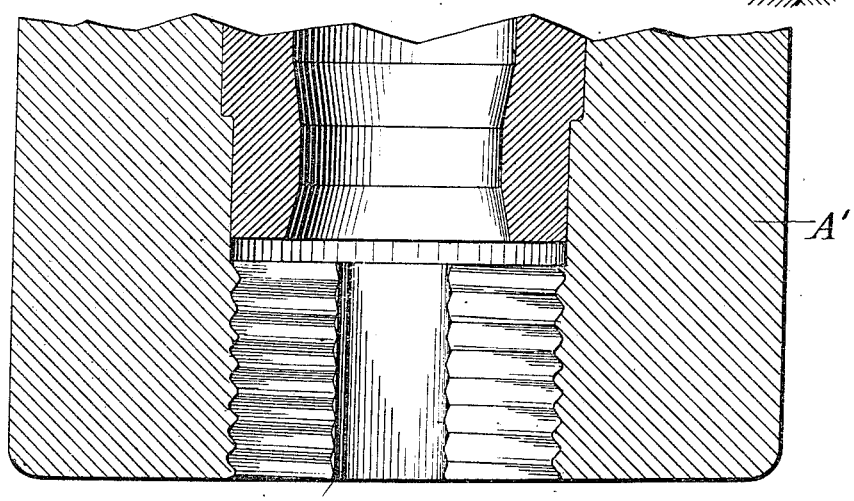
Figure 7:
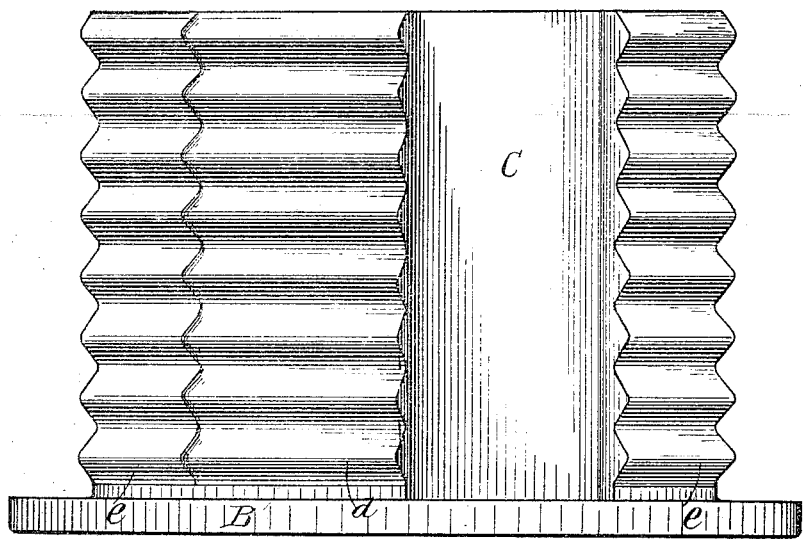
Figure 8:
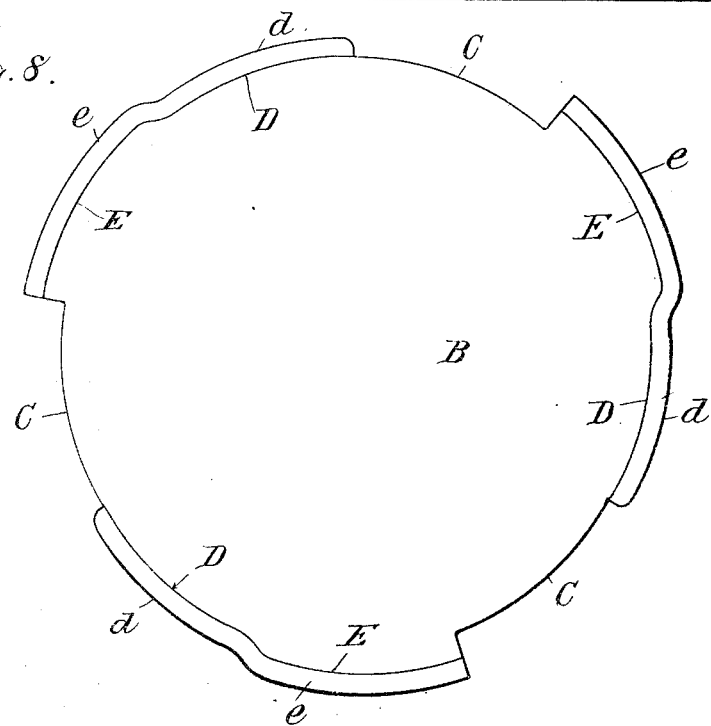
Figure 12:
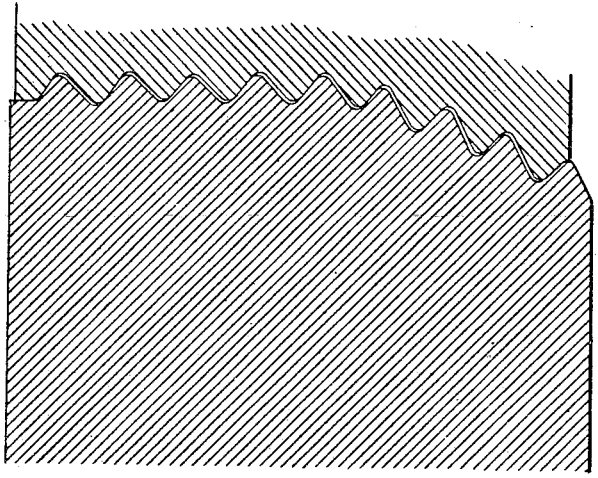
Fig. 12 shows the perfect engagement of my collars on a breech block partly cylindrical and partly conical.
Figure 13:
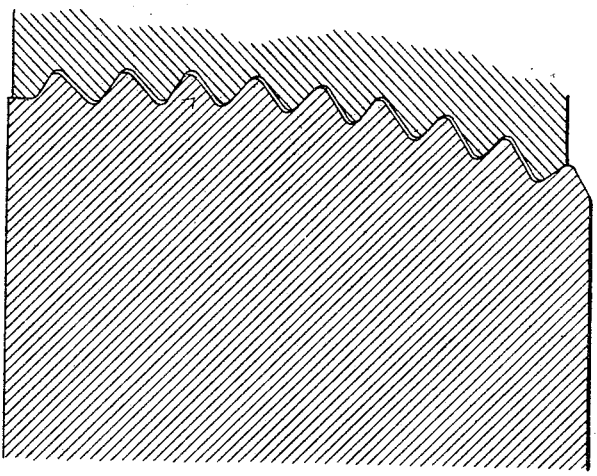
Fig. 13 shows the perfect engagement of my collars on a breech block of truncated spindle shape nearly unscrewed.
Figure 14:
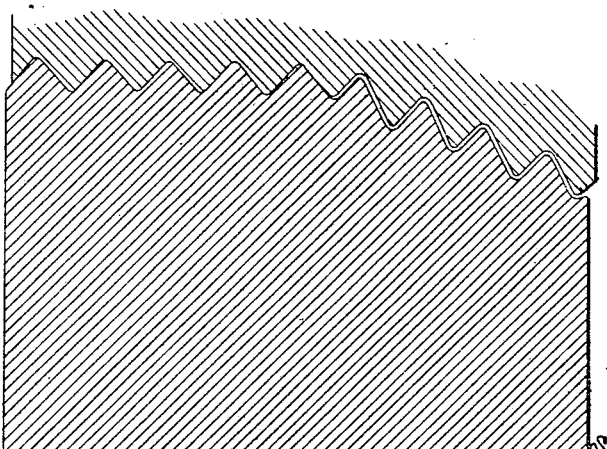
Figure 15:
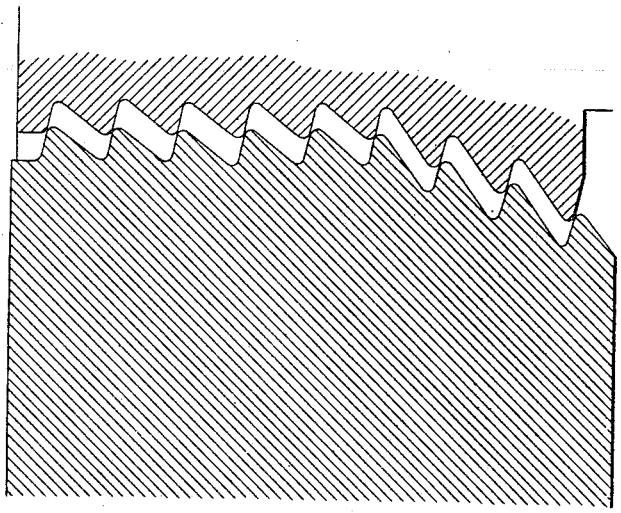
Figure 16:
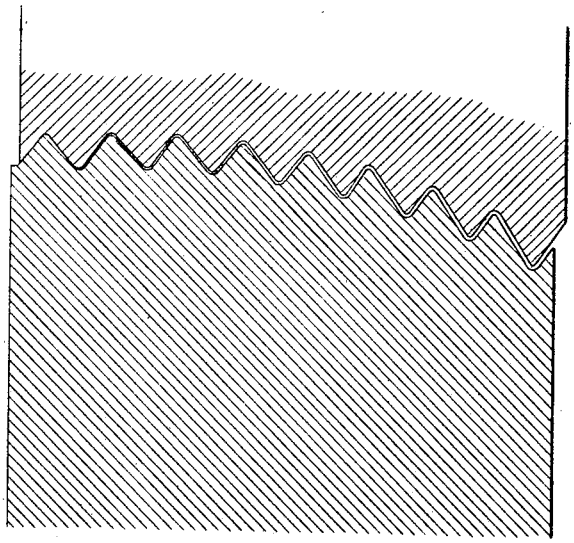

In the embodiment of my invention illustrated in Fig. 6, the collars are given an inclination to the axis of the breech block; that is, they have a helical direction, while also having the characteristics of the collars or threads illustrated in Figs. 1 to 5. The breech block in this embodiment of my invention has thus two helical motions, the first derived from the combined effect of the eccentricity of the threads with the sloping thrust surfaces, and the second due to the helical form of the threads. This helical inclination of the threads may be made to act either in the same direction with the helical effect, illustrated in Figs. 1 to 5, or, as illustrated in Fig. 6, the helical direction of the threads may be made to act in the reverse direction of the first helical effect. If the two helical effects are in the same direction or both positive, they increase the pitch, which is equal to the sum of the two. If the two helical effects are in opposite directions or one of them negative, they counter-act each other and decrease the resultant pitch of the breech block and make a flatter or less inclined thrust surface possible.

It is obvious that various changes can be made in the above illustrated construction, which will embody the spirit of my invention. For instance, the order of steps and eccentricity can be reversed from that illustrated in the drawing, so that the locking motion will take place in the opposite direction of rotation from that illustrated.

Throughout the specification and claims by the word "collar" is meant a circumferential rib, without pitch or advance in an axial direction. By the word "thread" is meant a circumferential rib having pitch or advance in an axial direction. The term "circumferential rib" is intended to include both a collar and a thread.

I claim:

1. In a breech mechanism, the combination of a breech block and screw box, each of which is provided with eccentric circumferential ribs, each of which circumferential ribs is formed in a progressive series of steps.

2. In a breech mechanism, the combination of a breech block and screw box, each of which has eccentric circumferential ribs, each of which circumferential ribs is formed in a progressive series of steps, and also has plane surfaces adjacent to the lowest step of said circumferential ribs.

3. In a breech mechanism, the combination of a breech block and screw box, each of which has circumferential ribs, each of which circumferential ribs is formed in a progressive series of steps, and also has blank spaces between each two of said series.

4. In a breech mechanism, the combination of a breech block and screw box, each of which is provided with eccentric circumferential ribs, each of which circumferential ribs is formed in a series of steps of progressively greater radii.

5. In a breech mechanism, the combination of a breech block and screw box, each of which is provided with eccentric circumferential ribs, each of which circumferential ribs is formed in a series of steps of progressively greater radii, said block and screw box having blank spaces adjacent to the lowest of said steps.

6. In a breech mechanism, the combination of a breech block and screw box, each of which is provided with eccentric circumferential ribs, each of which circumferential ribs is formed in a series of steps of progressively greater radii, said block and screw box having blank spaces between each two of said series.

7. In a breech mechanism, the combination of a breech block and screw box, each of which is provided with eccentric circumferential ribs, each of which circumferential ribs is formed in a progressive series of steps, said breech block and screw box each having several series of said circumferential ribs.

8. In a breech mechanism, the combination of a breech block and screw-box, each of which is provided with eccentric circumferential ribs, each of which circumferential ribs is formed in a series of steps of progressively greater radii.

9. In a breech mechanism, the combination of a breech block and screw box, each of which is provided with eccentric threads, each of which threads is formed in a series of steps of progressively greater radii.

10. In a breech mechanism, the combination of a breech block and screw box, each of which is formed with a series of eccentric helical threads, each of which threads is formed in steps of progressively greater radii, and having blank spaces adjacent to the lowest of said steps.

11. In a breech mechanism, the combination of a breech block and screw box, each of which is provided with eccentric helical circumferential ribs, each of said circumferential ribs being formed in a series of steps of progressively greater radii, said breech block and screw box being provided with several series of such circumferential ribs, there being a blank space between each two of said series of circumferential ribs.

12. In a breech mechanism, the combination of a breech block and screw box, each of which is provided with a series of eccentric helical collars or threads each of said collars or threads being formed in a series of steps of progressively greater radii, and each of said collars or threads having an inclined thrust surface, the helical effects of the eccentricity and inclined thrust surfaces being opposed to the helical inclination of the threads.

13. In a breech mechanism, the combination of a breech block and screw box, each of which is provided with eccentric circumferential ribs, each of said circumferential ribs being formed in a series of steps of progressively greater radii, said circumferential ribs having inclined thrust surfaces.

14. In a breech mechanism, the combination of a breech block and screw box, each of which is provided with eccentric circumferential ribs, each of said circumferential ribs being formed in a series of steps of progressively greater radii, said circumferential ribs having inclined thrust surfaces, there being blank spaces adjacent to the lowest of said steps.

15. In a breech mechanism, the combination of a breech block and screw box, each of which is provided with eccentric circumferential ribs having inclined thrust surfaces, each of said circumferential ribs being formed in a series of steps of progressively greater radii, said breech block and screw box being provided with several series of said circumferential ribs, there being blank spaces between each two of said series.

16. In a breech mechanism, the combination of a breech block and screw box, each of which is provided with eccentric circumferential ribs having inclined thrust surfaces, the eccentricity of the circumferential ribs being less than their depth.

17. In a breech mechanism, the combination of a breech block and screw-box, each of which is provided with a circumferential rib having a thrust slope proportioned to the advance to be obtained and having an eccentricity in the turning distance to unlock, less than the depth of the circumferential rib.

18. In a breech mechanism, the combination of a breech block and screw-box, each of which is provided with a circumferential rib having an eccentricity in the turning distance to lock, less than the depth of the circumferential rib, and having a thrust slope so proportioned to the advance to be obtained as to remain always in contact.

19. In a breech mechanism, the combination of a breech block and a screw-box, each of which is provided with circumferential ribs having an eccentricity in the turning distance, less than the depth of the circumferential rib, the thrust slopes of the several circumferential ribs being so proportioned that all the circumferential ribs shall remain equally in contact.

20. In a breech mechanism, the combination of a breech block and screw-box, each of which is provided with circumferential ribs that will disengage equally at all points at the same time and that have an eccentricity less than the depth of the circumferential ribs.

In testimony that I claim the foregoing I have hereunto set my hand.

SIGARD A. S. HAMMAR.

Witnesses:
  EDWIN J. PRINDLE,
  LILLIE CASS.